United States Patent
Sumiyoshi et al.

(10) Patent No.: US 7,190,739 B2
(45) Date of Patent: Mar. 13, 2007

(54) REGENERATOR CIRCUIT OF SERIAL DATA AND METHOD OF REGENERATING THE SAME

(75) Inventors: Nobuya Sumiyoshi, Kyoto (JP); Masaya Hirakawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 633 days.

(21) Appl. No.: 10/648,484

(22) Filed: Aug. 27, 2003

(65) Prior Publication Data

US 2004/0042577 A1 Mar. 4, 2004

(30) Foreign Application Priority Data

Aug. 27, 2002 (JP) ............................ 2002-246224

(51) Int. Cl.
  H04L 27/06 (2006.01)
  H04L 7/00 (2006.01)
(52) U.S. Cl. ....................................... 375/316; 375/368
(58) Field of Classification Search ................ 375/316, 375/368, 354; 341/144, 145; 348/607, 614
See application file for complete search history.

(56) References Cited

U.S. PATENT DOCUMENTS

| | | | | |
|---|---|---|---|---|
| 4,825,411 A | * | 4/1989 | Hamano | ................ 365/189.04 |
| 5,170,338 A | * | 12/1992 | Moritoki et al. | ................ 700/2 |
| 5,412,789 A | * | 5/1995 | Ohki | .............................. 711/1 |
| 2002/0027964 A1 | | 3/2002 | Yoo et al. | |

* cited by examiner

Primary Examiner—Khai Tran
(74) Attorney, Agent, or Firm—Sughrue Mion, PLLC

(57) ABSTRACT

In order to extract proper signals out of signals containing jitters and skews, the most stable data rows are selected out of data rows obtained by oversampling. A regenerator circuit of serial data is comprised of means for storing serial data as received for two system clocks, means for comparing special character signals used in transmission with the data as stored for two system clocks, and determination means for determining positions (shift numbers) where patterns of the data match the special character signal, respectively, wherein correction for skews is implemented by sampling the data on the basis of information on the positions where matching is made, as determined by the determination means. Furthermore, correction for jitters and skews is implemented by a method of regenerating serial data, comprising the steps of three-times oversampling serial data as received, dividing the serial data as oversampled into three edge groups, detecting a shift number matching special characters for each of the groups by the process described, selecting an edge group undergoing the least change in shift number, and regenerating video signal from the edge group.

6 Claims, 10 Drawing Sheets

REGENERATOR CIRCUIT OF SERIAL DATA AND METHOD OF REGENERATING THE SAME

FIELD OF THE INVENTION

The invention relates to a regenerator circuit of serial data, for correcting skew and jitter in sampling of serial signals received in a multi-channel and a method of regenerating the serial data.

BACKGROUND OF THE INVENTION

A liquid crystal monitor has since been put to use as a display of personal computers, rapidly replacing a CRT. With the liquid crystal monitor of today, a VGA connector is in use for an interface, however, in the case of a system connected via the VGA connector, processing inside equipment is executed with digital signals, and transmission is executed with analog signals. Since video signals are high frequency signals, the signals are distorted in an analog transmission system, and if the distorted signals are sent out to the liquid crystal monitor as they are, this will result in degradation of display quality of liquid crystals. Accordingly, a DVI (Digital Visual Interface) used for digital transmission has lately become a focus of attention.

FIG. 10 is a block diagram showing a video card 110 connected with a liquid crystal controller 120 via a DVI cable 130. The video card 110 is made up of a video controller 111, a TMDS (Transition Minimized Differential Signaling) transmitter (encoder) 112, and a DVI connector 113 while the liquid crystal controller 120 is made up of a DVI connector 121, a TMDS receiver (decoder) 122, and a panel interface 123. TMDS is a digital transmission system of video signals for noise reduction and DC balance, specifying a transmission system of video signals (use is made of 3 pairs (R, G, B) of data signals and 1 pair of system clock signals) between an output circuit of video signals on the video card and an input circuit thereof on the side of a display. With the use of the DVI connectors, digital signals are transmitted and processed from an input to the liquid crystal controller, shown in FIG. 10.

When sampling a stream of serial data entered into a display device via the DVI, there occurs a problem of clock skew. The clock skew occurs in the case where the phase of a clock signal, for use in determining a time of sampling serial data, deviates from the phase of a serial data signal. The clock skew tends to occur in the case where, for example, a cable for transmission of the clock signal differs in respect of quality, cable length, and density from a cable for transmission of the serial data signal.

Techniques for resolving the problem of the clock skew are disclosed in, for example, JP-B- 3112688. In the case of the techniques, synchronization and discrimination of data are implemented by majority determination of serial data three-times over-sampled, however, a serial data recovery system of the invention according to JP-B- 3112688, comprises a PLL, a multi-bit block assembly, an inter-channel synchronous circuit, and so forth, and is therefore complex in circuit configuration, so that a circuit simple in configuration has been highly desired. Further, since unstable data affected by a jitter component is used as a basis of determination by majority, there is a problem with certainty as for results of determination on "0s", "1s", so that a jitter problem caused by variation of a clock itself could not be resolved by the techniques described above.

It is assumed that the DVI is long in cable length in a range of 3 to 10 m, and the longer a cable is, the more susceptible to the effect of performance on a transmitter side the DVI becomes, so that data come to contain jitters and skews.

Such jitters and skews give rise to jitters of images and jitters of a screen when image signals are displayed on a display device, thereby creating a major cause of difficulty to see.

SUMMARY OF THE INVENTION

The invention has been developed to resolve those problems described, and a first object of the invention is to eliminate and correct for jitters and skews. Further, it is a second object of the invention to implement correction for jitters and skews by means of a simple circuit configuration.

To achieve the above objects, a regenerator circuit of serial data according to the first aspect of the invention comprises means for receiving data from a transmission system for transmitting a plurality of serial data in one system clock period, means for storing serial binary data as received for two system clocks, means for comparing a specified pattern signal used in transmission with a data row constituting a continuous portion of the serial binary data as stored for two system clocks, and determination means for determining the data row matching the specified pattern signal used in transmission, wherein sampling of data is executed on the basis of information on a position of the data row, in the serial binary data for two system clocks, as determined by the determination means.

A regenerator circuit of serial data according to the second aspect of the invention comprises means for receiving data from a transmission system for transmitting serial data in one system clock period, oversampling means for oversampling serial binary data as received, means for extracting a plurality of serial binary data signals from the serial binary data as oversampled, means for storing the serial binary data signals as extracted for two system clocks, means for comparing a special character signal used in transmission with a data row constituting a continuous portion of the serial binary data signals as extracted and stored for two system clocks, determination means for determining a data row matching a specified pattern, and means for computing maintenance and transition of information on a position of the data row, in the serial binary data for two system clocks, as determined by the determination means, wherein the most stable sampled serial binary data signal row is selected out of the plurality of the serial binary data signals as oversampled on the basis of results of computation described above.

A regenerator circuit of serial data according to the third aspect of the invention, in the second aspect of the invention, the oversampling means being n-times (n is an integer) oversampling means comprises division means for dividing the serial binary data as oversampled into n groups of data in accordance with a timing of the oversampling, and selection means for selecting the group having the data row which state of matching special characters is maintained most often for each of the n groups of data as divided by the division means, wherein data of the group as selected by the selection means is selected.

A method of regenerating serial data according to the fourth aspect of the invention comprises the steps of receiving data from a transmission system for transmitting serial data in one system clock period, storing serial binary data as received for two system clocks, comparing a specified pattern signal used in transmission with a data row constituting a continuous portion of the serial binary data as stored for two system clocks, determining the data row matching the specified pattern signal used in transmission, and executing sampling of data on the basis of information on a position of the data row, in the serial binary data for two system clocks, as determined in the step of determining the data row.

A method of regenerating serial data according to the fifth aspect of the invention comprises the steps of receiving data from a transmission system for transmitting serial data in one system clock period, oversampling serial binary data as received, extracting a plurality of serial binary data signals from the serial binary data as oversampled, storing the serial binary data signals as extracted for two system clocks, comparing a special character signal used in transmission with a data row constituting a continuous portion of the serial binary data signals as extracted and stored for two system clocks, determining a data row matching a specified pattern, computing maintenance and transition of information on a position of the data row, in the serial binary data for two system clocks, as determined in the step of determining the data row, and selecting the most stable sampled serial binary data signal row out of the plurality of the serial binary data signals as oversampled on the basis of results of computation described above.

A method of regenerating serial data according to according to the sixth aspect of the invention, in the fifth aspect of the invention, the step of oversampling being the step of n-times oversampling comprises the steps of dividing the serial binary data as oversampled into n groups of data in accordance with a timing of the oversampling, selecting the group having the data row which state of matching special characters is maintained most often for each of the n groups of data as divided in the step of dividing the serial binary data, and selecting data of the group as selected in the step of selecting the group.

PREFERRED EMBODIMENTS OF THE INVENTION

An embodiment of a regenerator circuit of serial data according to the invention is described hereinafter with reference to FIG. 1 broadly showing an IC for a DVI to which the regenerator circuit of serial data is applied.

Figure 1:
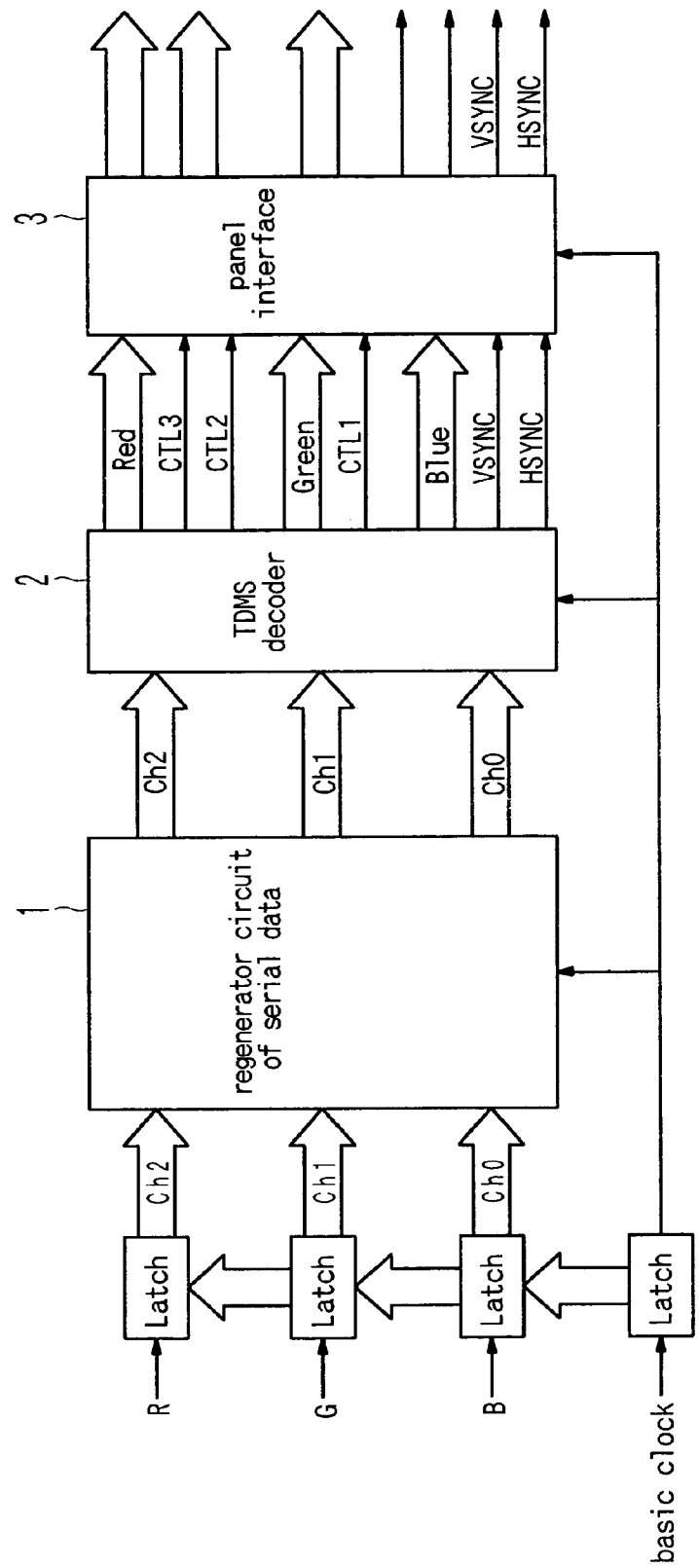
FIG. 1 is a circuit block diagram showing an IC for a DVI to which an embodiment of a regenerator circuit of serial data according to the invention, is applied.

FIG. 1 shows a processing block on a receiving side, to which data of R, G, B, and a system block are transferred via a DVI. In the figure, when signals of R, G, B, respectively, and a system block signal are fed from the DVI, the respective signals are once held in latches, respectively. A regenerator circuit 1 of serial data corrects for jitters and skews concerning serial signals fed from respective latch circuits, and synchronizes the serial signals before feeding the same to a TMDS decoder 2 in a succeeding stage. The TMDS decoder 2 decodes the serial signals as TMDS-encoded and feed decoded signals along with the respective signals of R, G, B and horizontal and vertical synchronous signals to a panel interface 3. The panel interface 3 is an interface for converting the signals fed from the TMDS decoder 2 into signals for use in a display panel.

The present invention is an invention concerned with the regenerator circuit 1, and is intended to utilize specified special characters in data signals, used during blanking periods, in order to make correction for jitters and skews, and to statistically process the same so as to recover data by selecting stable data rows obtained as a result of such processing.

Now, the special characters are described hereinafter.

Figure 2:
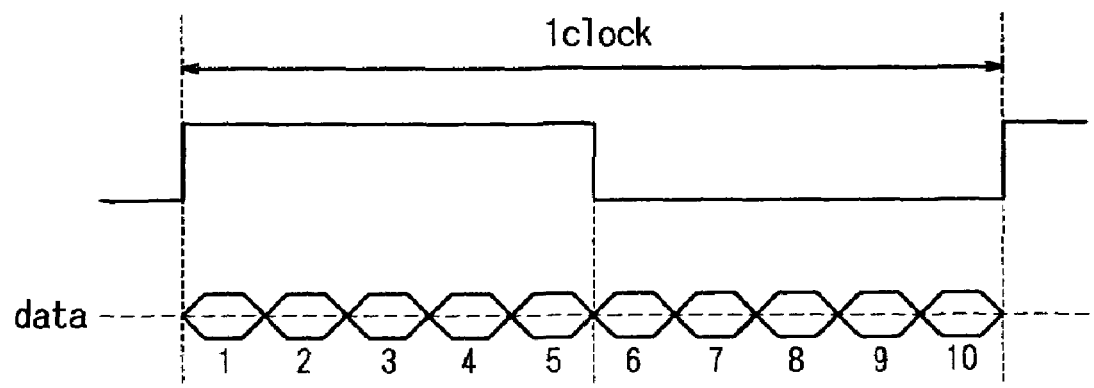
FIG. 2 shows a timing chart of serial data according to the invention.

FIG. 2 shows a timing chart of serial signals. According to the DVI specification, 10 bits of serial signals are transferred in one system clock that is the minimum clock for use in driving a system. R, G, B data are transmitted during video display periods while the following special characters each made up of 10 bits as signals for expressing 4 blankings, respectively, are transmitted during blanking periods:

That is,
1101010100
0010101011
0101010100
1010101011

With the invention, corrections for skews and jitters, respectively, are executed at the time of regeneration of video signals by utilizing these special characters.

Figure 3:
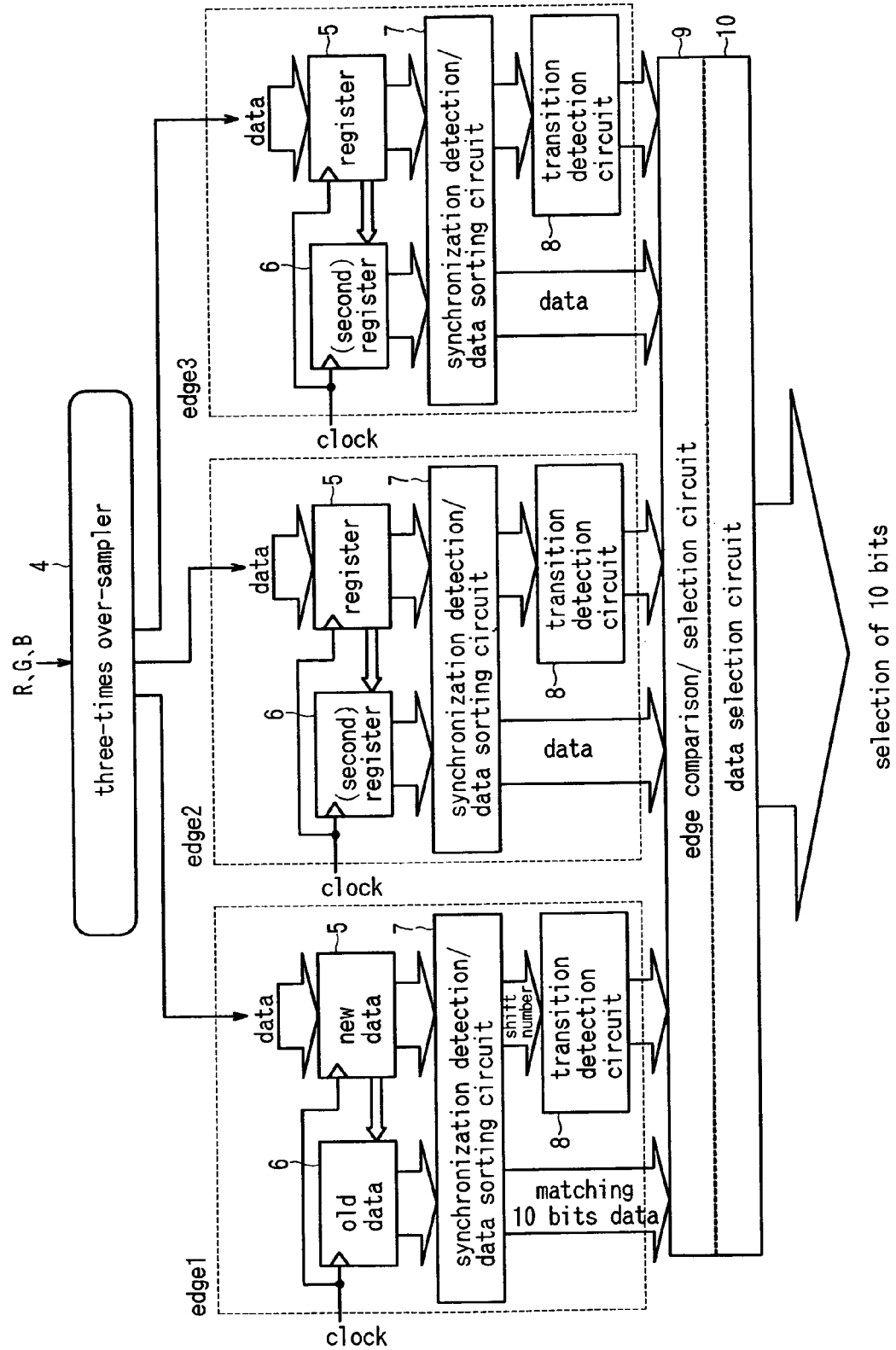
FIG. 3 is a block diagram of the regenerator circuit of serial data according to the embodiment of the invention.

FIG. 3 shows a schematic configuration of the embodiment of the regenerator circuit of serial data according to the invention. The regenerator circuit 1 of serial data is provided for each of R, G, B color signals and respective regenerator circuits of serial data generate three data groups (edge 1, edge 2, edge 3) by the agency of a three-times over-sampler 4, feeding the three data groups to registers 5 (hereinafter, number n represents n, n', n ", respectively) respectively. In accordance with a system clock signal, the data groups each are stored in respective second registers 6, and are expanded to 20 bits data with addition of newly fed 10 bit data to be thereby fed to a synchronization detection/data sorting circuit 7 in a succeeding stage.

The synchronization detection/data sorting circuit 7 executes matching of the 20 bits data as fed with the special characters, delivering 10 bits data out of the 20 bits data, matching with the special characters, to a data selection circuit 10, while delivering optimum shift numbers to a transition detection circuit 8, respectively. The transition detection circuit 8 computes the number of transitions of a matching pattern and the number of durations. Further, an edge comparison/selection circuit 9 executes statistic processing for each of the edges, and selects the most stable edge to be thereby delivered. The data selection circuit 10 delivers optimum 10 bits data on the basis of the edge selected as delivered.

Figure 4:
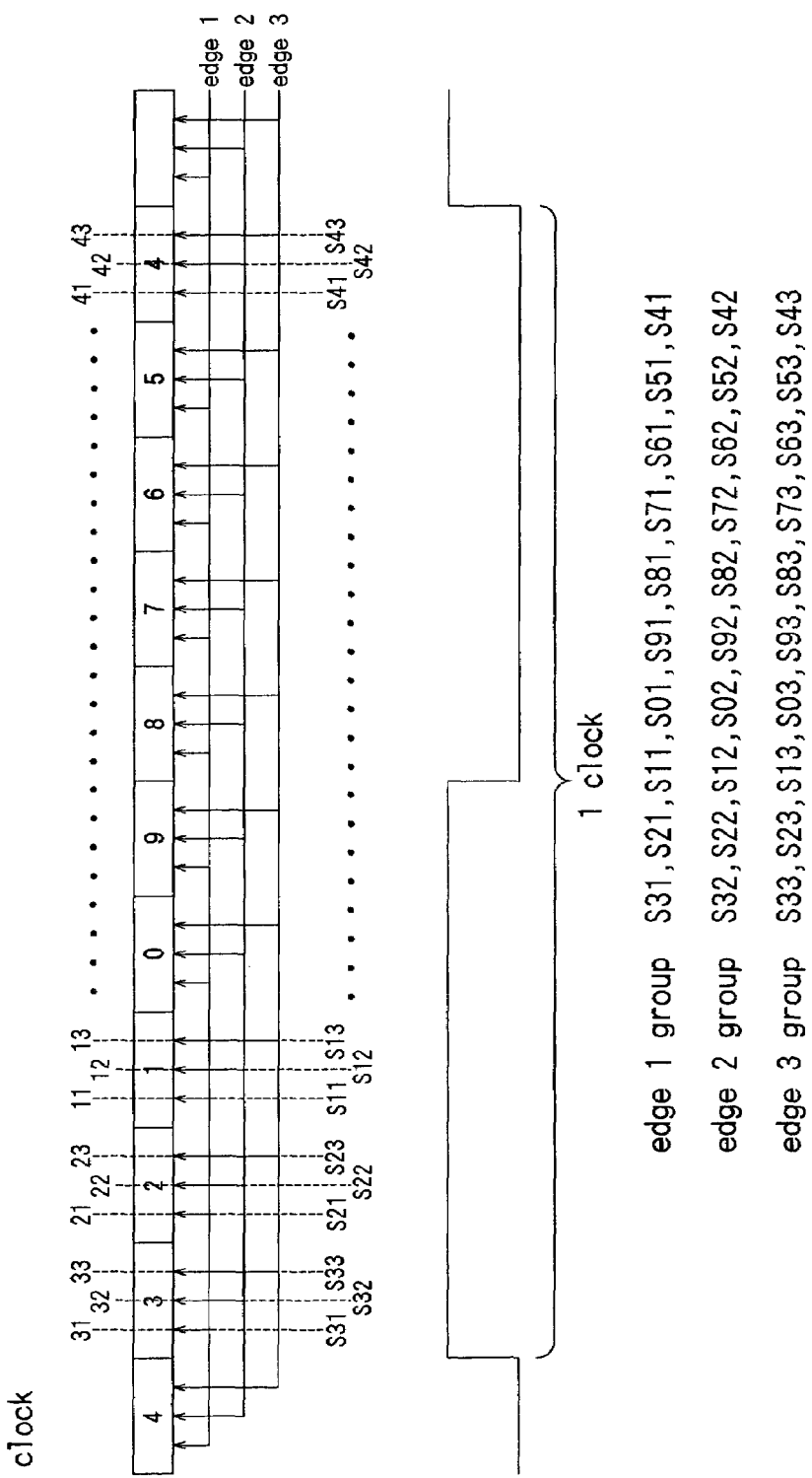
FIG. 4 is a diagram for illustrating oversampling operation.

FIG. 4 is a diagram illustrating three-times oversampling operation by the over-sampler 4. In FIG. 4, serial data received per one system clock are 10 bits serial data, and 10 bits from bit 3 through bit 4 are sampled by the three-times oversampling method, that is, sampled in accordance with oversampling clocks of clocks 31 through 33, 21 through 23, 11 through 13, 01 through 03, 91 through 93, . . . , and 41 through 43, respectively, thereby creating data of 30 binary values, S31, S32, S33, S21, S22, S23, S11, S12, S13, S01, S02, S03, S91, S92, S93, . . . , and S41, S42, S43.

These data are divided into three groups of an edge 1 group, edge 2 group, and edge 3 group.

The edge 1 group is a data group of S31, S21, S11, S01, S91, . . . , and S41, sampled at a first sampling pulse of the three-times oversampling, the edge 2 group is a data group of S32, S22, S12, S02, S92, . . . , and S42, sampled at a second sampling pulse of the three-times oversampling, and the edge 3 group is a data group of S33, S23, S13, S03, S93, . . . , and S43, sampled at a third sampling pulse of the three-times oversampling.

Figure 5:
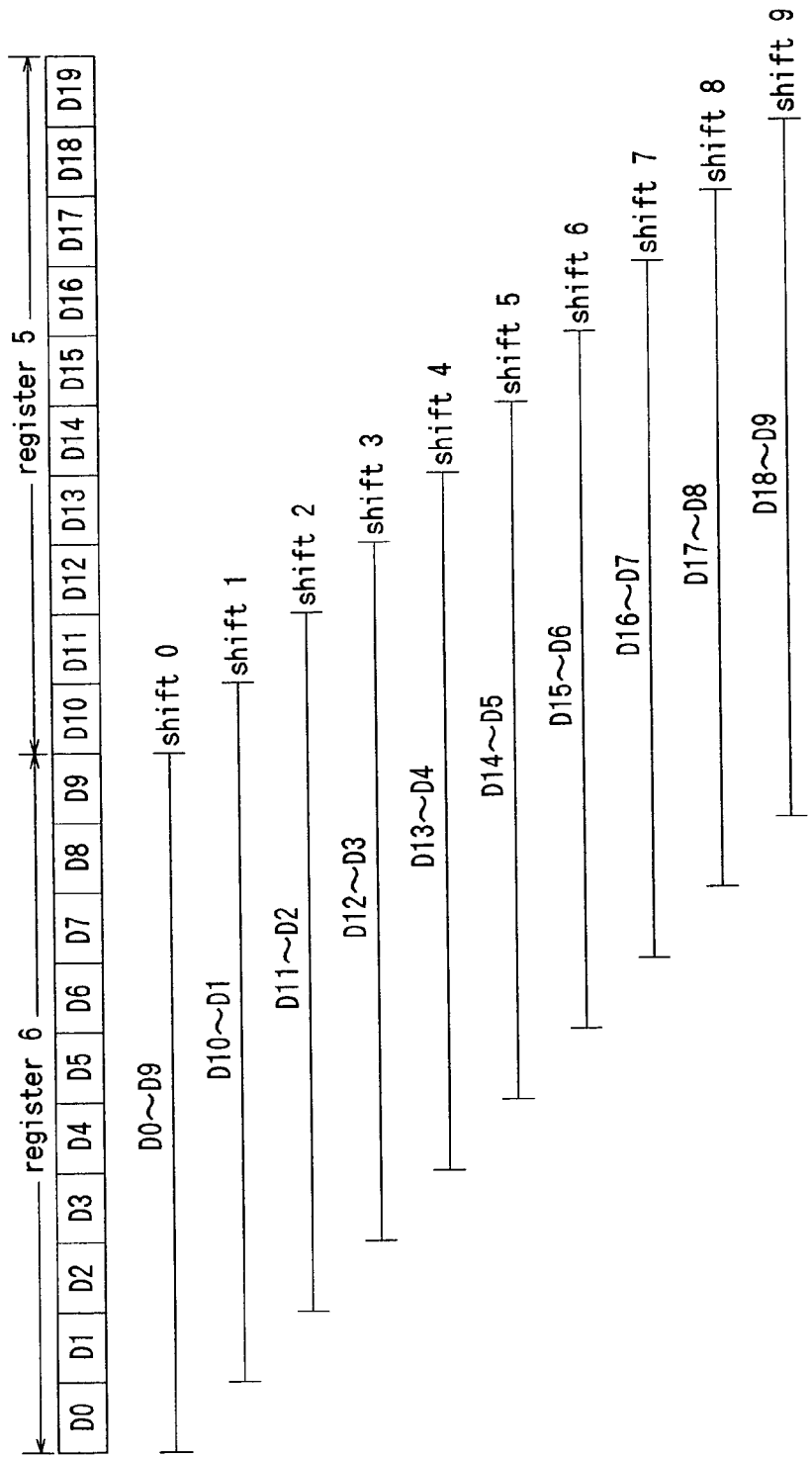
FIG. 5 is a schematic illustration showing a relationship between registers and shift numbers.

FIG. 5 is a schematic illustration showing a relationship between a register of 20 bits, comprising the register 5 and the register 6, and shift numbers each representing a data row of continuous 10 bits out of data of the 20 bits.

Those edge groups are fetched by the register 5 incorporating D0 through D9, shown in FIG. 5, and the register 6 incorporating D10 through D19, shown in FIG. 5, respectively, and are expanded to 20 bits to be thereby sorted into data rows each consisting of 10 bits.

That is, there are formed a data row of from D0 through D9 (referred to shift 0), a data row of from D1 through D10 (referred to shift 1), a data row of from D2 through D11 (referred to shift 2), a data row of from D3 through D12 (referred to shift 3), . . . , and a data row of from D9 through D18 (referred to shift 9).

Figure 6:
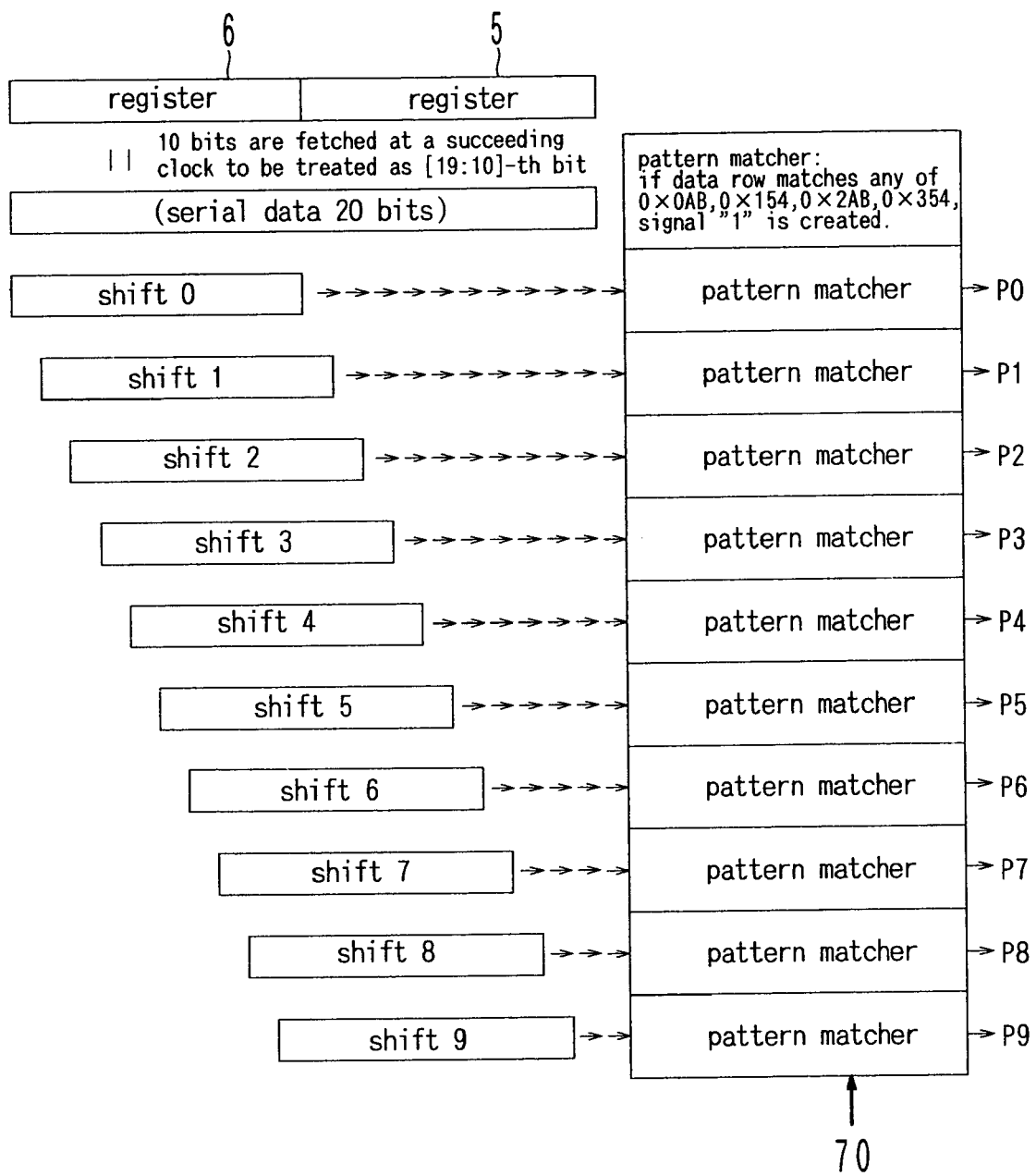
FIG. 6 is a block diagram showing a circuit configuration of a synchronization detection/data sorting circuit.

FIG. 6 is a block diagram showing the configuration of the synchronization detection/data sorting circuit. In the figure, the synchronization detection/data sorting circuit 7 comprises ten pattern matchers 70, and the respective data rows of the shifts 0 through 9 as fed are fed to the pattern matchers 70, respectively, The respective pattern matchers 70 store the four special characters as previously described, comparing the respective data rows of the shifts 0 through 9 as fed during the blanking periods with the four special characters, respectively, and generate a signal 1 if both match while setting a flag at a relevant shift number. If both do not match, a signal 0 is generated, and the respective pattern matchers 70 deliver output signals p0 through p9, respectively.

The special characters are received in the blanking periods, and when properly received, there exist patterns matching with the special characters, respectively.

A position where the special character matches the data row at this point in time, that is, the shift number, matching the special character, is decided upon.

By fetching video data based on the respective shift numbers, video data with skews corrected are created.

For example, if a fifth pattern matches one of the special characters, a flag is set at the shift 5, and data of the shift 5 are fetched as data for display in video display periods thereafter.

Skews of the video data are corrected as described above. If there exit no pattern matching any of the special characters, an existing flag state is maintained. The output signals described above are fed to the transition detection circuit 8 in a succeeding stage.

Figure 7:
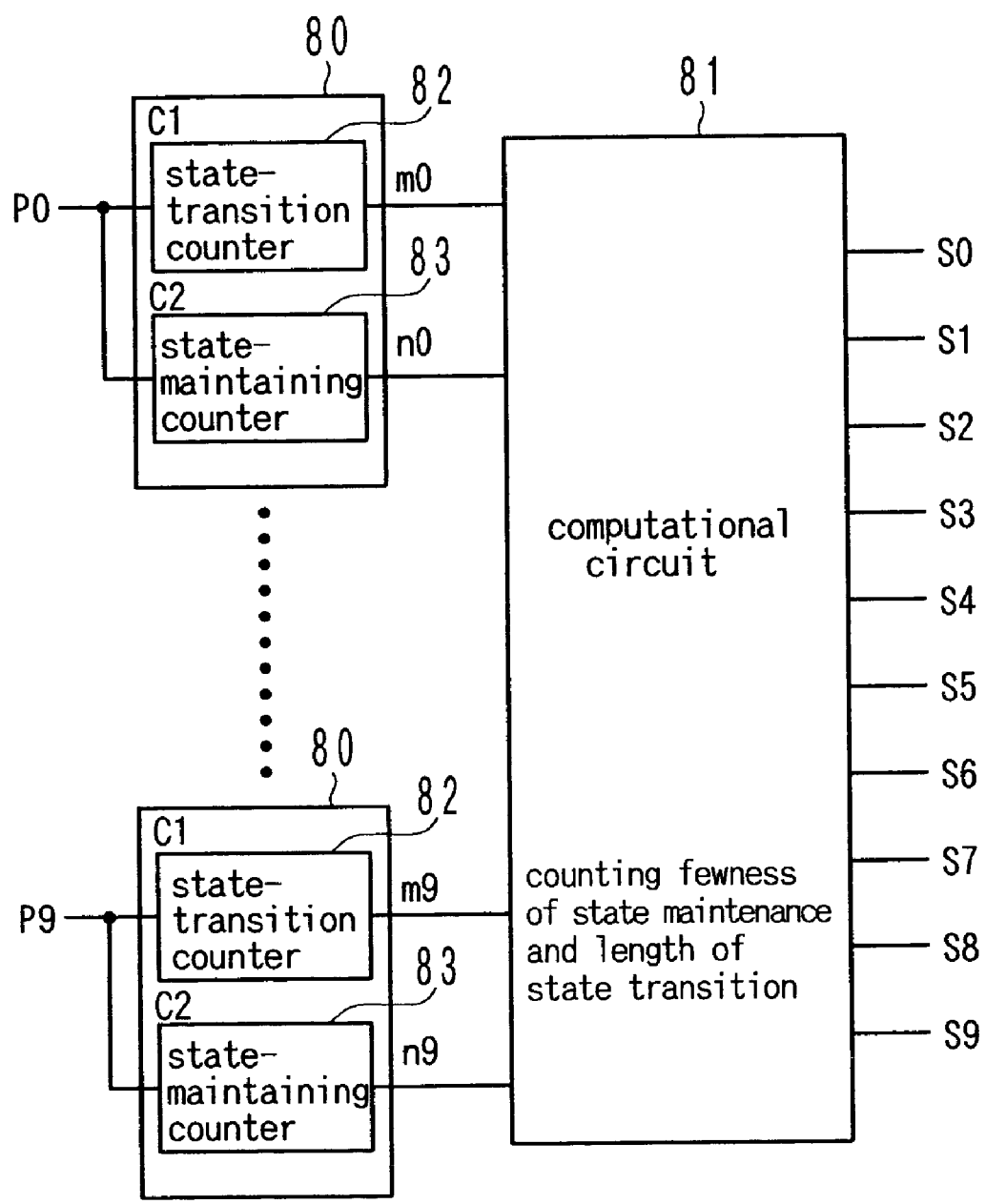
FIG. 7 is a circuit block diagram of a transition detection circuit.

FIG. 7 is a circuit block diagram of the transition detection circuit 8. In the figure, the transition detection circuit 8 comprises state counters 80 and a computational circuit 81, and the respective state counters 80 are provided with a state-transition counter 82 and state-maintaining counter 83.

When the output signals p0 through p9, delivered from the respective pattern matchers 70 in the preceding stage, are fed to the state counters 80, respectively, the state-maintaining counter 83 counts how many times a matching pattern is continuously detected and the state-transition counter 82 counts transitions of the matching pattern for each of the shifts. These counting results m, n, respectively, are fed to the computational circuit 81.

The computational circuit 81 computes a length of time when the pattern has matched the special character for each of the shifts, selecting the shift number that is determined to have the longest matching time.

As described in the foregoing, the special characters, that is, the specified patterns in the blanking periods are searched in the synchronization detection/data sorting circuit 7, and the patterns matching the special characters, respectively, are detected, thereby deciding upon the shift numbers. Thus, the shift numbers are selected for each of the edges, and sampling of video data with skews corrected can be executed.

Subsequently, in the transition detection circuit 8, there are counted how many times the matching patterns thus obtained are continuously detected, or transitions of the matching patterns.

A process of selecting an optimum edge is implemented by use of the edge comparison selection circuit 9 and the data selection circuit 10.

Figure 8:
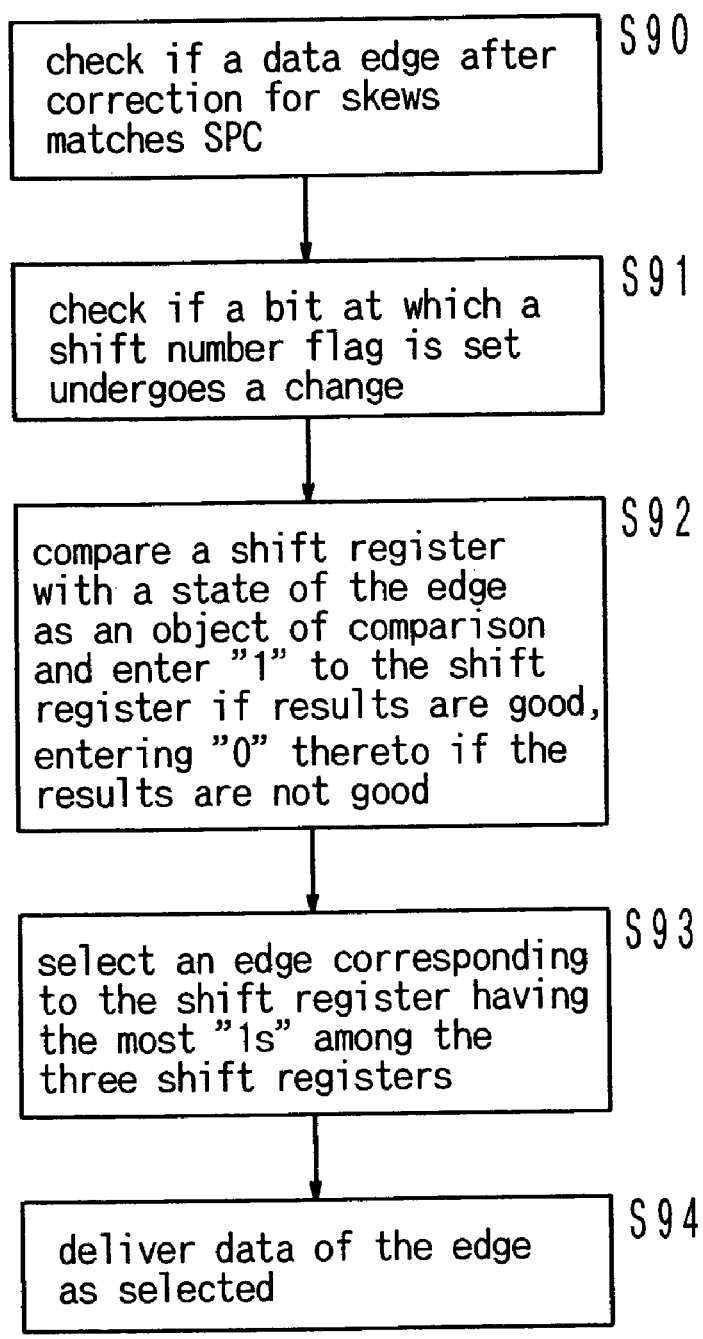
FIG. 8 is a flow chart showing a process of selecting an optimum edge.

FIG. 8 is a flow chart showing the process of selecting an optimum edge from the three edges. First, in step S90, results of operation by the respective pattern matchers are fed, and whether or not the respective data edges after correction for skews match the special characters (SPC), respectively, is checked.

Subsequently, in step S91, the results of the operation by the respective pattern matchers are fed, and checking is made on whether a bit at which a flag is set with reference to the shift number for each of the data edges undergoes a change or is maintained.

Following the above, in step S92, a shift register of 15 bits, provided for each of the edges, is compared with a state of the edge as an object of comparison to thereby study appropriateness as to results of comparison, and "1" is entered to the shift register if the results are good, entering "0" thereto if the results are not good.

In step S93, the edge corresponding to the shift register having the most "1 s" among the three shift registers is taken as the optimum edge.

In step S94, data of the edge as selected are delivered.

By citing an example, the process is described as follows. Suppose the data edge 1 after correction for skews matches the special characters, the data edge 2 after correction for skews matches the special characters, and the data edge 3 after correction for skews does not match the special characters as the results of the step S90. In this case, proper sampling of the data is not implemented for the edge 3.

Further, suppose a bit at which a flag is set with reference to the shift number of the edge 1 has undergone a change, a bit at which a flag is set with reference to the shift number of the edge 2 is maintained, and a bit at which a flag is set with reference to the shift number of the edge 3 is maintained as the results of the step S91. In this case, it can be said that the edge 1 is susceptible to effects of skews and jitters.

Subsequently, in the step 92, the respective edges are compared with each other in accordance with the results described above. Such comparison is described hereinafter with reference to FIG. 9.

Figure 9:
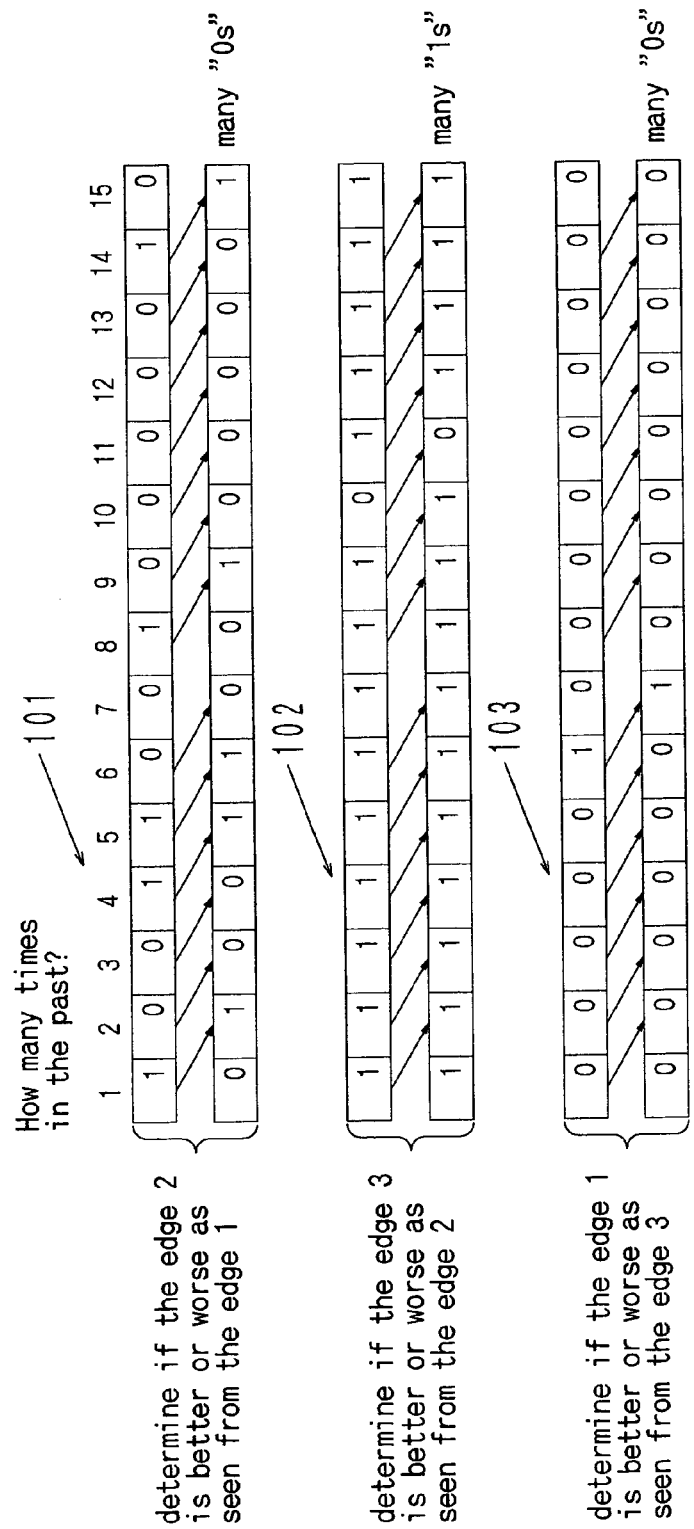
FIG. 9 is a schematic representation showing respective operations of shift registers used for selection of the optimum edge.
Figure 10:
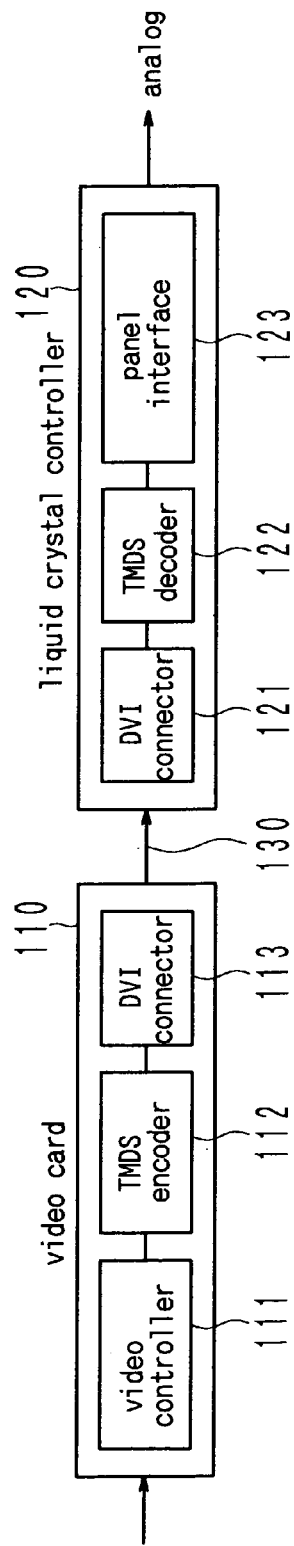
FIG. 10 is a block diagram showing connection of a video card, using a DVI, with a liquid crystal controller using a DVI.

FIG. 9 is a schematic representation showing respective operations of the three shift registers (101, 102, 103). The shift register in respective upper rows shows a state of the shift register in a preceding stage, and the shift register in respective lower rows shows a state of the shift register that has undergone a change upon receiving the results of the comparison.

1. The Shift Register 101

In the shift register 101, the edge 1 is compared with the edge 2. Since the bit at which the flag is set with reference to the shift number of the edge 1 has undergone a change in the step S91, it is determined that the edge 2 is better as seen from the edge 1. Because the edge 2 is better as seen from the edge 1, "0" is entered to the shift register 101 in accordance with the rule.

2. The Shift Register 102

In the shift register 102, the edge 2 is compared with the edge 3. Since the data of the edge 3 after correction for the skews do not match the special characters in the step S90, it is determined that the edge 2 is better than the edge 3 as seen from the edge 2. Because the edge 2 is better than the edge 3, "1" is entered to the shift register 102 in accordance with the rule.

3. The Shift Register 103

In the shift register 103, the edge 3 is compared with the edge 1. Since the data of the edge 3 after correction for the skews do not match the special characters in the step S90, it is determined that the edge 1 is better as seen from the edge Because the edge 1 is better as seen from the edge 3, "0" is entered to the shift register 103 in accordance with the rule.

In the step S93, among the three shift registers, the shift register 101 has many "0s", and upon comparing the edge 1 with the edge 2, it can be determined that the edge 2 is better while upon comparing the edge 2 with the edge 3, it can be determined that the edge 2 is better because the shift register 102 has many "1s". Further, the shift register 103 has many "0s", and upon comparing the edge 3 with the edge 1, it can be determined that the edge 1 is better. In consequence, as a result of summing up these determinations, it is concluded that the edge 2 is the best edge.

In the step S94, data according to the edge 2 as selected are regenerated.

With the invention, since sampling of data is executed by implementing correction for skews with the use of the special characters that are the specified pattern signals, and further by executing statistical processing of the edges in oversampling data to thereby select the most stable data, it is possible to regenerate the most proper data.

Furthermore, since the regenerator circuit of the invention can be made up of simple circuits such as registers, a matching circuit, counters, and so forth, the invention is highly effective from the viewpoint of designing as well as cost.

What is claimed is:

1. A regenerator circuit of serial data comprising:
   means for receiving data from a transmission system for transmitting a plurality of serial data in one system clock period;
   means for storing serial binary data as received for two system clocks;
   means for comparing a specified pattern signal used in transmission with a data row constituting a continuous portion of the serial binary data as stored for two system clocks; and
   determination means for determining the data row matching the specified pattern signal used in transmission;
   wherein sampling of data is executed on the basis of information on a position of the data row, in the serial binary data for two system clocks, as determined by the determination means.

2. A regenerator circuit of serial data, comprising:
   means for receiving data from a transmission system for transmitting serial data in one system clock period;
   oversampling means for oversampling serial binary data as received;
   means for extracting a plurality of serial binary data signals from the serial binary data as oversampled;
   means for storing the serial binary data signals as extracted for two system clocks;
   means for comparing a special character signal used in transmission with a data row constituting a continuous portion of the serial binary data signals as extracted and stored for two system clocks;
   determination means for determining a data row matching a specified pattern; and
   means for computing maintenance and transition of information on a position of the data row, in the serial binary data for two system clocks, as determined by the determination means;
   wherein the most stable sampled serial binary data signal row is selected out of the plurality of the serial binary data signals as oversampled on the basis of results of computation described above.

3. The regenerator circuit of serial data according to claim 2, said oversampling means being n-times (n is an integer) oversampling means comprising:
   division means for dividing the serial binary data as oversampled into n groups of data in accordance with a timing of the oversampling; and
   selection means for selecting the group having the data row in which state of matching with special characters is maintained most often for each of the n groups of data as divided by the division means, wherein data of the group as selected by the selection means is selected.

4. A method of regenerating serial data, comprising the steps of:
   receiving data from a transmission system for transmitting serial data in one system clock period;
   storing serial binary data as received for two system clocks;
   comparing a specified pattern signal used in transmission with a data row constituting a continuous portion of the serial binary data as stored for two system clocks;
   determining the data row matching the specified pattern signal used in transmission; and
   executing sampling of data on the basis of information on a position of the data row, in the serial binary data for two system clocks, as determined in the step of determining the data row.

5. A method of regenerating serial data comprising the steps of:
   receiving data from a transmission system for transmitting serial data in one system clock period;
   oversampling serial binary data as received;
   extracting a plurality of serial binary data signals from the serial binary data as oversampled;
   storing the serial binary data signals as extracted for two system clocks;
   comparing a special character signal used in transmission with a data row constituting a continuous portion of the serial binary data signals as extracted and stored for two system clocks;
   determining a data row matching a specified pattern;
   computing maintenance and transition of information on a position of the data row, in the serial binary data for two system clocks, as determined in the step of determining the data row; and
   selecting the most stable sampled serial binary data signal row out of the plurality of the serial binary data signals as oversampled on the basis of results of computation described above.

6. The method of regenerating serial data according to claim 5, said step of oversampling being the step of n-times oversampling, comprising the steps of:
   dividing the serial binary data as oversampled into n groups of data in accordance with a timing of the oversampling;
   selecting the group having the data row in which state of matching with special characters is maintained most often for each of the n groups of data as divided in the step of dividing the serial binary data; and
   selecting data of the group as selected in the step of selecting the group.

* * * * *